United States Patent
Kerr et al.

(10) Patent No.: US 9,684,581 B2
(45) Date of Patent: Jun. 20, 2017

(54) DETERMINING OVERALL PERFORMANCE CHARACTERISTICS OF A CONCURRENT SOFTWARE APPLICATION

(71) Applicant: NVIDIA CORPORATION, Santa Clara, CA (US)

(72) Inventors: Andrew Robert Kerr, Atlanta, GA (US); Matthew Grant Bolitho, San Mateo, CA (US); Igor Sevastiyanov, San Jose, CA (US); Scott Ricketts, San Francisco, CA (US); Michael Andersch, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 72 days.

(21) Appl. No.: 14/283,700

(22) Filed: May 21, 2014

(65) Prior Publication Data
US 2015/0339209 A1   Nov. 26, 2015

(51) Int. Cl.
| | |
|---|---|
| G06F 9/46 | (2006.01) |
| G06F 11/34 | (2006.01) |
| G06F 9/455 | (2006.01) |
| G06F 11/36 | (2006.01) |
| G06F 9/45 | (2006.01) |

(52) U.S. Cl.
CPC .......... *G06F 11/3428* (2013.01); *G06F 9/455* (2013.01); *G06F 11/34* (2013.01); *G06F 11/3612* (2013.01); *G06F 8/433* (2013.01)

(58) Field of Classification Search
None
See application file for complete search history.

(56) References Cited

U.S. PATENT DOCUMENTS

| | | | | |
|---|---|---|---|---|
| 6,249,901 | B1 * | 6/2001 | Yuan | G06F 17/5022 716/103 |
| 8,046,601 | B1 * | 10/2011 | Paz | G06F 1/26 713/300 |
| 2003/0005419 | A1 * | 1/2003 | Pieper et al. | 717/141 |
| 2005/0081206 | A1 * | 4/2005 | Armstrong et al. | 718/100 |

(Continued)

*Primary Examiner* — Adam Lee
(74) *Attorney, Agent, or Firm* — Artegis Law Group, LLP

(57) ABSTRACT

One embodiment of the present invention includes a dependency extractor and a dependency investigator that, together, facilitate performance analysis of computer systems. In operation, the dependency extractor instruments a software application to generate run-time execution data for each work task. This execution data includes per-task performance data and dependency data reflecting linkages between tasks. After the instrumented software application finishes executing, the dependency investigator evaluates the captured execution data and identifies the critical path of tasks that establishes the overall run-time of the software application. Advantageously, since the execution data includes both task-level performance data and dependencies between tasks, the dependency investigator enables the developer to effectively optimize software and hardware in computer systems that are capable of concurrently executing tasks. By contrast, conventional performance analysis may not correctly identify critical paths in software applications that execute tasks in parallel across multiple processing units and, consequently, may misdirect optimization efforts.

21 Claims, 5 Drawing Sheets

(56) References Cited

U.S. PATENT DOCUMENTS

| | | | |
|---|---|---|---|
| 2008/0300851 A1* | 12/2008 | Chakrabarti et al. ........... 703/22 | |
| 2009/0089092 A1* | 4/2009 | Johnson ................ G06F 19/327 | 705/2 |
| 2009/0112557 A1* | 4/2009 | King ................... G06F 17/5031 | 703/15 |
| 2009/0158287 A1* | 6/2009 | Cardelli ................ G06F 9/5038 | 718/102 |
| 2009/0158294 A1* | 6/2009 | Perticara' .............. G06F 9/5038 | 718/106 |
| 2010/0070315 A1* | 3/2010 | Lu ......................... G06Q 10/06 | 705/7.22 |
| 2010/0138268 A1* | 6/2010 | Guo ...................... G06Q 10/06 | 705/7.11 |
| 2013/0061192 A1* | 3/2013 | Ganesan ............ G06F 17/5031 | 716/113 |
| 2013/0144679 A1* | 6/2013 | Burnett ............ G06Q 10/06313 | 705/7.27 |
| 2014/0136177 A1* | 5/2014 | Lee .................... G06F 17/5054 | 703/14 |
| 2014/0237302 A1* | 8/2014 | Berry, Jr. ............ G06F 11/3409 | 714/47.1 |

* cited by examiner

DETERMINING OVERALL PERFORMANCE CHARACTERISTICS OF A CONCURRENT SOFTWARE APPLICATION

BACKGROUND OF THE INVENTION

Field of the Invention

The present invention generally relates to computer science and, more specifically, to determining overall performance characteristics of a concurrent software application.

Description of the Related Art

A typical computer system includes a central processing unit (CPU) and one or more parallel processing units (PPU). Some PPUs are capable of very high performance using a relatively large number of small, parallel execution threads on dedicated programmable hardware processing units. The specialized design of such PPUs usually allows these PPUs to perform certain tasks, such as rendering 3-D scenes, much faster than a CPU. However, the specialized design of these PPUs also limits the types of tasks that the PPU can perform. By contrast, the CPU is typically a more general-purpose processing unit and therefore can perform most tasks. Consequently, the CPU usually executes the overall structure of a software application and then configures the PPUs to implement tasks that are amenable to parallel processing.

As part of optimizing software applications and/or designing future computer systems to improve run-time performance of software applications, developers often conduct performance analysis. In one approach to performance analysis, the developers repeatedly execute software applications or pieces of code known as "benchmarks" on a simulator designed to emulate the computer system. Subsequently, the developers analyze the run-time performance of these various simulations to determine latencies and bottlenecks and guide development of software and hardware.

As computer systems have become increasingly heterogeneous, with multiple processors types interacting and executing portions of software applications in parallel, the time required to simulate such benchmarks has increased. Notably, the time required to simulate comprehensive benchmarks on full-chip simulators is often unacceptably long. Consequently, developers reduce the number of instructions included in each benchmark to a small subset of the computer instructions included in larger software applications—"micro-benchmarks." Further, the developers typically conduct the performance analysis using simulators with limited scope, such as chip-level or unit-level simulators.

Although running micro-benchmarks on simulators with limited scope reduces the time required for performance analysis, the resulting performance data does not necessarily accurately reflect the overall performance of complex software applications. For example, suppose that a software application were to concurrently execute two tasks, task A and task B, on a computer system that included multiple PPUs. Further, suppose that task A but not task B was part of the sequence of tasks that determines the overall runtime of the software application—known as the "critical path." Finally, suppose that one micro-benchmark were to represent task A and a different micro-benchmark were to represent task B. In such a scenario, the associated performance analysis would not convey that the overall performance of the software application would be improved by reducing the execution time of task A, but not necessarily by reducing the execution time of task B.

Since micro-benchmark performance analysis does not enable the developer to accurately evaluate overall performance of many complex software applications, such an approach dramatically reduces the effectiveness of performance analysis. In particular, using the data from such a constrained performance analysis may not enable the developer to effectively optimize the design of software applications or computer system hardware.

As the foregoing illustrates, what is needed in the art is a more effective approach to performance analysis of software applications across multiple processing units.

SUMMARY OF THE INVENTION

One embodiment of the present invention sets forth a computer-implemented method for performance analysis of computer systems. The method includes receiving a software application that is configured to execute multiple tasks; causing the execution of the software application to generate execution data that includes performance data for each of the multiple tasks and dependency links between different tasks included in the multiple tasks; and based on the execution data, determining a subset of tasks included in the multiple tasks that is included in a critical path that establishes the overall execution speed of the software application.

One advantage of the disclosed approach is that the performance analysis enables the user to effectively optimize software and hardware in computer systems that are capable of concurrently executing tasks. Notably, tracking the execution data per-task in addition to the dependencies between tasks enables the correct and efficient identification of the critical path. Consequently, the results of this dependency-based performance analysis may better direct optimization efforts than the results of conventional performance analysis that may not correctly identify critical paths in the presence of parallelism.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
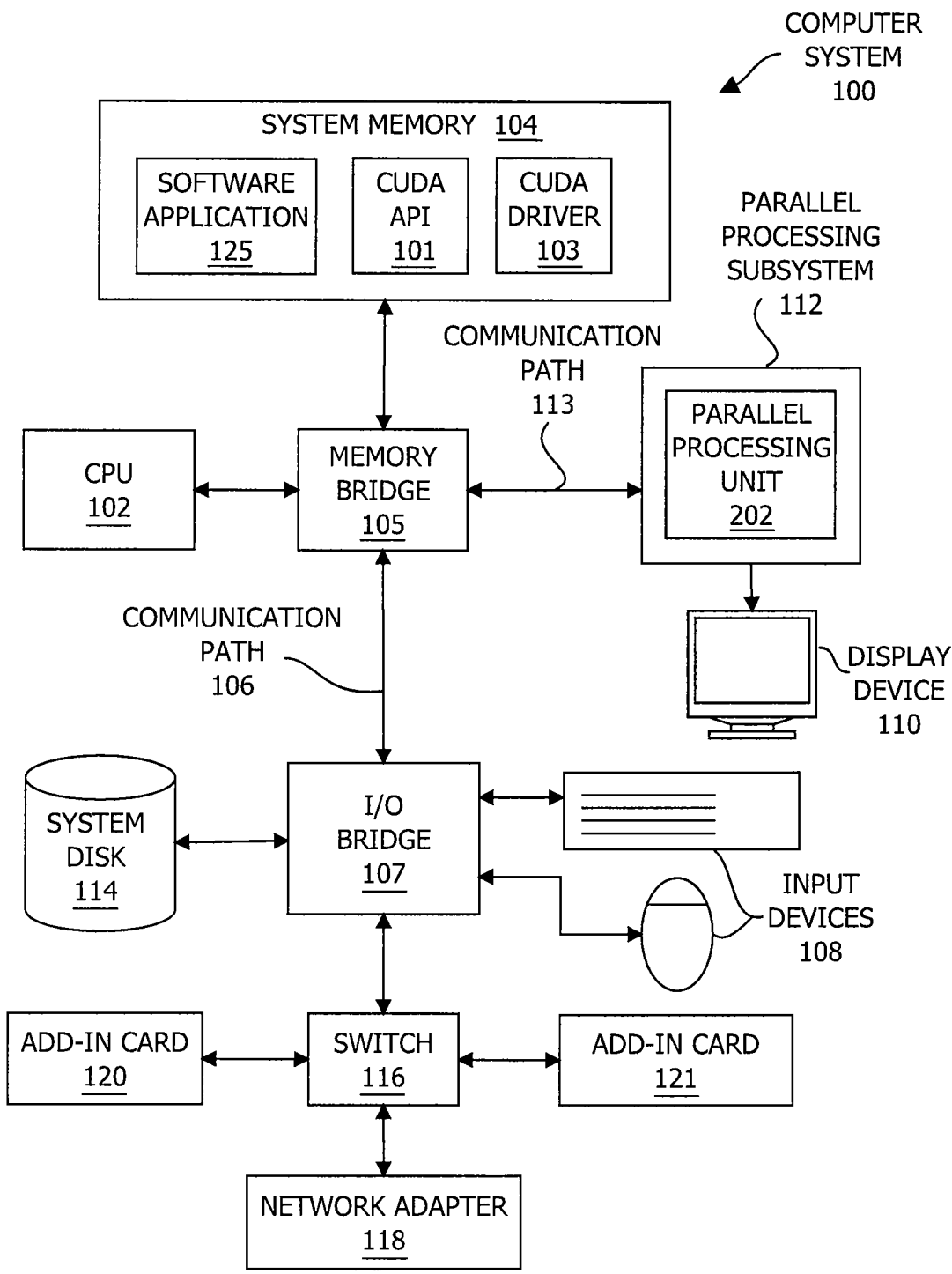
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs) 202 included within parallel processing subsystem 112. In other embodiments, the parallel processing subsystem 112 incorporates circuitry optimized for general purpose and/or compute processing. Again, such circuitry may be incorporated across the PPUs 202 included within the parallel processing subsystem 112 that are configured to perform such general purpose and/or compute operations. In yet other embodiments, the PPUs 202 included within the parallel processing subsystem 112 may be configured to perform graphics processing, general purpose processing, and compute processing operations.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

In operation, the CPU 102 is the master processor of the computer system 100, controlling and coordinating operations of other system components. In particular, the CPU 102 issues commands that control the operation of the PPUs 202. Those commands may originate within a software application 125 resident in the system memory 104 and executing on the CPU 102. As shown, the system memory 104 also includes a compute unified device architecture (CUDA) application programming interface (API) 101 and a CUDA driver 103. CUDA is a general-purpose computing environment which uses the parallel processing subsystem 112 to perform various computing tasks. The CUDA API 101 includes calls and libraries that expose the functionality of the parallel processing subsystem 112 to application developers. And the CUDA driver 103 is configured to translate the application CUDA requests received by the CUDA API 103 to lower-level commands that execute on the PPUs 202 within the parallel processing subsystem 112

In alternate embodiments, the CUDA API 101 and/or the CUDA driver 103 may be replaced with any set of software programs that expose and manage parallel processing subsystem 112 functionality. For instance, the CUDA API 101 and the CUDA driver 103 may be replaced with a different general-purpose compute driver or a graphics driver respectively. Further, the CUDA API 101 and the CUDA driver 103 may be configured to inter-operate with one or more additional APIs and drivers.

As noted above, any number of the PPUs 202 may be included in the parallel processing subsystem 112. For example, multiple PPUs 202 may be provided on a single add-in card, or multiple add-in cards may be connected to communication path 113, or one or more of the PPUs 202 may be integrated into a bridge chip. The PPUs 202 in a multi-PPU system may be identical to or different from one another. For example, different PPUs 202 might have different numbers of processing cores and/or different amounts of memory. In implementations where multiple PPUs 202 are present, those PPUs 202 may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Often, the PPUs 202, as well as the CPU 102 and other components included in the computer system, are architected to optimize the run-time performance of the software applications 125. As part of the optimization process, developers may conduct performance analysis to gain insight into latencies that occur while the computer system 100 executes the software applications 125 across the heterogeneous processors. Based on these latencies, system developers may alter various components included in the computer system 100, thereby optimizing the execution efficiency of the computer system 100. Alternatively, software developers may modify algorithms included in a particular software application 125 to improve the performance of the particular software application 125. In general, developers may use performance analysis to drive any number and type of improvements to the software and hardware in the computer system 100.

Performance analysis is facilitated by executing the software application 125 on the computer system 100 in a manner that captures relevant run-time data. Different portions of the software application 125, known as "tasks," may concurrently execute across different processing units, such as the CPU 102 and the PPUs 202. To accurately attribute execution latencies between tasks, the computer system 100 is configured to capture performance data at the task-level in addition to various dependencies between tasks. In alternate embodiments, the performance analysis data may be captured by executing the software application 125 on a simulator designed to emulate any number of the components, including all, in the computer system 100. In some embodiments, the performance analysis may be used to guide development of future computer systems 100 that include next-generation PPUs 202, next-generation CPUs 102, etc. In general, any number of software applications 125 may be executed as part of performance analysis.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
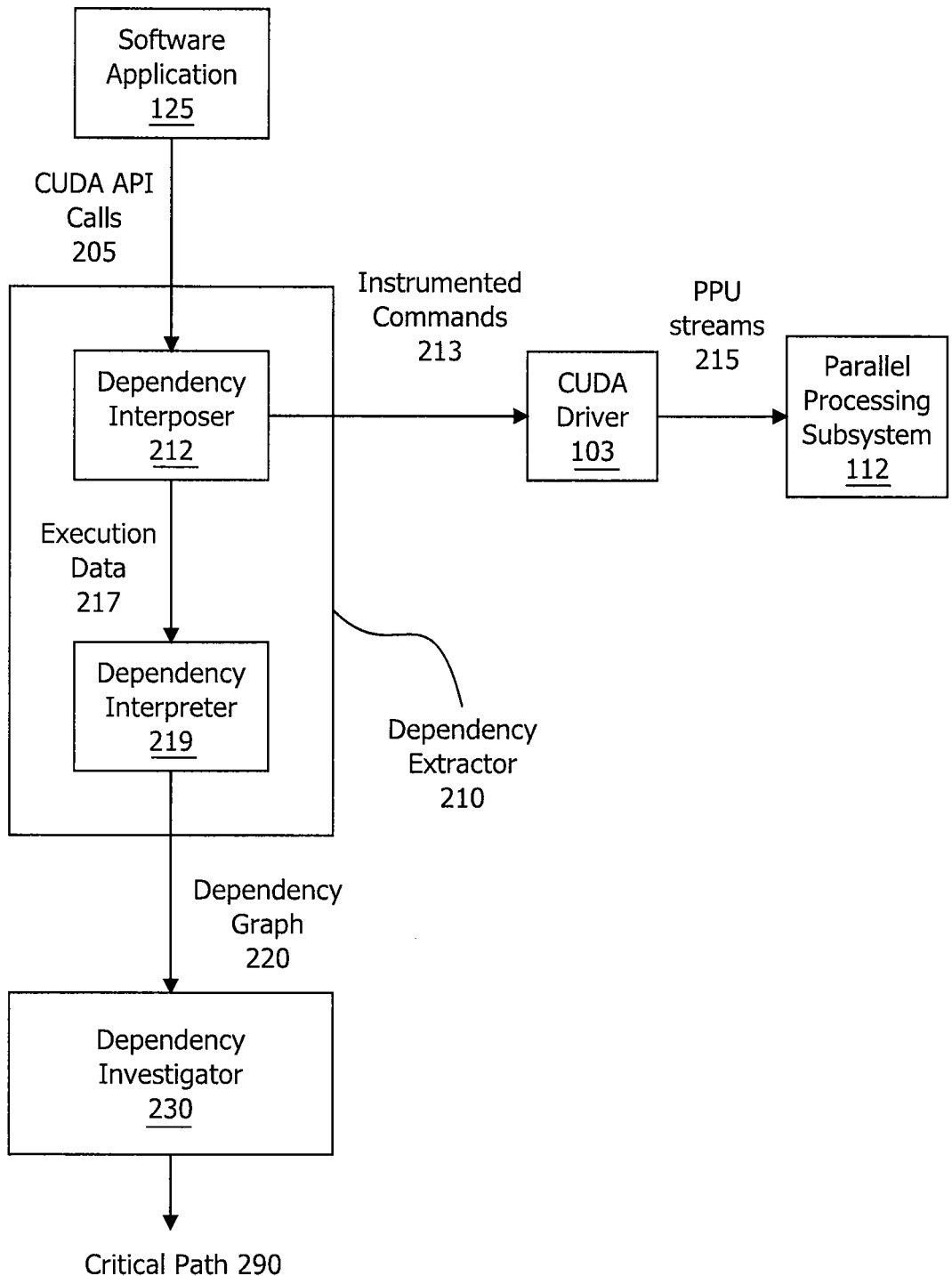
FIG. 2 is a conceptual diagram illustrating how the software application of FIG. 1 is processed to determine a critical path, according to one embodiment of the present invention.

FIG. 2 is a block diagram illustrating how the software application 125 of FIG. 1 is processed to determine a critical path 290, according to one embodiment of the present invention. In operation, the software application 125 executes across multiple processing units, such a one or more PPUs 202 and one or more CPUs 102, included in the computer system 100. Advantageously, the system depicted in FIG. 2 enables developers to determine an optimal manner in which to execute the software application 125 across the multiple processing units.

As shown, a dependency extractor 210 generates a dependency graph 220 that is processed by an application—a dependency investigator 230. Among other things, the dependency investigator 230 determines the critical path 290 of the software application 125 based on the dependency graph 220. The dependency extractor 210 and the dependency investigator 230 are included in the system memory 104 and execute on the CPU 102 and the PPUs 202. In alternate embodiments, the dependency extractor 210 and the dependency investigator 230 may be implemented in any technically feasible fashion in either software or hardware. In some embodiments, the dependency extractor 210 and the dependency investigator 230 may be implemented in a simulation system designed to emulate the computer system 100.

As is well known, the critical path 290 is the series of tasks included in the software application 125 that establishes the overall run-time of the software application 125. In general, a task is a work component included in the software application 125 that has a defined entrance and exit, such as an API call, an operation executed on a particular PPU 202, or a computation operation on the CPU 102. The CPU 102 typically executes one or more CPU "streams" of tasks, and the CUDA driver 103 submits one or more PPU streams 215 to the parallel processing subsystem 112 for execution within the parallel processing subsystem 112. Each stream (either a particular CPU stream or a particular PPU stream 215) may include any number and combination of tasks. Within each stream, the tasks typically execute in issue-order, however tasks included in different streams may run concurrently and may be interleaved. Further, the software application 125 may include specific instructions, such as explicit synchronization commands or memory copies, that enforce an ordering between tasks within a single stream or between streams. In alternate embodiments, tasks may be organized in any fashion that enables both sequential and concurrent execution.

Typically, executing the software application 125 involves launching large numbers of tasks (thousands or millions) across a variety of different processing units in a concurrent manner. To represent these complex interactions effectively, the performance analysis techniques disclosed herein enable investigation of the overall performance of the software application 125 at a per-task level. In particular, these performance analysis techniques capture dependencies between tasks and per-task runtime metrics, such as duration and hardware resource requirements. The dependencies include both control dependencies (e.g., a task determines which dependent task to execute next) and data (e.g., one task requires input from a different task) dependencies. For instance, a control or data dependency link between task A and task B captures that, as part of the correct execution of the software application 125, task B begins after task A completes.

As shown, the dependency extractor 210 includes a dependency interposer 212 and a dependency interpreter 219. The dependency interposer 212 modifies the software application 125 such that executing the software application 125 generates execution data 217. The execution data 217 includes both performance data and dependency data. More specifically, the dependency interposer 212 modifies the CUDA API calls 205 included in the software application 125, creating instrumented commands 213. The instrumented commands 213 cause execution of the software application 125 to create the execution data 219 for each of the tasks that executes on the PPU 202.

In one implementation, the dependency interposer 212 implements a dynamic library that encapsulates each of the CUDA API calls 205 before transmitting the instrumented commands 213 to the CUDA driver 103. Executing these instrumented commands 213 causes the incremental addition of per-task run-time data, such as start time and preceding task dependencies, to the execution data 217. For example, the instrumented command 213 corresponding to a particular CUDA API call 205 may be implemented as:

```
CUresult cuda::CudaDriverInterposer::cuLaunchKernel(CUfunction f, . . . ) {
    CUevent startEvent = startAsynchronousTimer(hStream);
    CUresult result;
```

```
CUDACALL(CudaDriver::cuLaunchKernel(f,gridDimX,gridDimY,gridDimZ,
    blockDimX,blockDimY,blockDimZ,sharedMemBytes,hStream,kernel
    Params,extra));
CUevent endEvent = startAsynchronousTimer(hStream);
capture.eventKernelLaunch(kernelNames[f].c_str( ),0,hStream,startEvent,
    endEvent);
RETURN_AFTER_API_CALL(result);
}
```

Further, the instrumented commands 213 associated with a particular task launch generate dependency data between the particular task and the "parent" task. And the instrumented commands 213 corresponding to an implicit or explicit task synchronization application call 205, such as a CUDA event call, generate additional dependency data between affected tasks.

The dependency interposer 212 also causes execution of the software application 125 to generate execution data 129 for each of the tasks executed on the CPU 102. The dependency interposer 212 may implement the measurement of the CPU 102 tasks in any technically feasible fashion. For instance, the dependency interposer 212 may inserts calls to an existing API designed to measure workload execution on CPUs.

In general, the dependency interposer 212 ensures that that the execution data 217 accurately reflects the per-task timing and overall flow of the software application 125. For instance, the dependency interposer 212 excludes the overhead associated with capturing the execution data 217, such as the time spent creating the data structures that store the execution data 217, from the run-time data (e.g., duration). Further, the dependency interposer 212 ensures that the execution data 217 reflects the appropriate ordering of tasks between the various processing units. For instance, typical software APIs for executing concurrent streams of tasks, such as the CUDA API calls 205, enable the creation of implicit dependencies between streams. The instrumented commands 213 corresponding to a task that involves synchronization to the CPU 102 enables the software application 125 to create a dependency edge when a particular event has occurred. An example implementation follows.

```
// CUDA application
    cuLaunchKernel(...,hStream);
    cuEventRecord(hEvent,...,hStream);
    .
    .
    .
    While (cuEventQuery(hEvent)==CUDA_ERROR_NOT_READY)
    {
        ; //spin
    }
// establish synchronization
    .
```

The performance analysis techniques described herein are illustrative rather than restrictive, and may be modified to reflect various implementations without departing from the broader spirit and scope of the invention. For instance, software applications 125 may be instrumented at the code level or the binary level using a variety of different instrumentation techniques. Embodiments of the current invention include any instrumentation techniques that enable both per-task and dependency tracking. Alternate embodiments may include any API, including none, instead of the CUDA API 101 or any driver, including none, instead of the CUDA driver 103.

After the instrumented software application 125 executes, the dependency interpreter 219 evaluates the execution data 217 and creates the dependency graph 220. As part of evaluating the execution data 127, the dependency interpreter 219 computes derived per-task performance data and infers additional dependencies between the tasks. The dependency graph 220 represents each task included in the software application 125 as a task node (not shown in FIG. 2) and each dependency between tasks as a directed dependency edge (also not shown in FIG. 2). In this fashion, the dependency graph 220 represents the execution data 217 that is relevant to performance analysis in a concise, intelligible manner. Notably, the dependency graph 220 efficiently captures the timing of each task included in the software application 125 as well as the relationships between all of the tasks included in the software application 125. The dependency graph 220 may store the dependency graph 220 in any technically feasible fashion in any available memory.

As shown, after the dependency interpreter 219 generates the dependency graph 220, the dependency investigator 230 generates the critical path 290. The dependency investigator 230 may determine the critical path 290 in any technically feasible fashion. For instance, the dependency investigator 230 may determine the critical path 290 based on conventional timing analysis algorithms, such as those employed for circuit analysis. As is well known, the execution time of any task node that is included in the critical path 290 impacts the overall run-time of the software application 125.

In various embodiments, the dependency investigator 230 includes functionality that presents the data embodied in the dependency graph 220 in user-friendly formats. For instance, the dependency investigator 230 may summarize those tasks that are included in the critical path 290, those tasks that are not included in the critical path 290, and the sensitivity of the software application 125 to improving the efficiency of various tasks. Among other things, the dependency investigator 230 facilitates investigation into which specific tasks and which processing unit (CPU 102, PPUs 202, etc.) limit the performance of the software application 125.

Advantageously, the dependency investigator 230 includes functionality that enables the user to modify the data included in the task nodes of the dependency graph 220, reanalyze the dependency graph 220, and regenerate the critical path 290. For instance, suppose that a system developer were interested in the impact of changing the type of a particular PPU 202. In such a scenario, the system developer could direct the dependency investigator 230 to scale the duration of all of the tasks executed on the particular PPU 202. The dependency investigator 230 would then update the dependency graph 220, reanalyze the dependency graph 220, and regenerate the critical path 290. In this manner, the dependency investigator 230 enables the developer to efficiently explore the impact of various scenarios on the overall execution time of the software application 125. By contrast, conventional approaches to such performance investigation typically require multiple, time-consuming re-simulations of the software application 125.

In some embodiments, the dependency investigator 230 includes functionality to compare and contrast the data included multiple dependency graphs 220 and/or critical paths 290. In alternate embodiments, the dependency investigator 230 may include any number of tools to load, analyze, modify, extract, and store data from the dependency graph 290.

Figure 3:
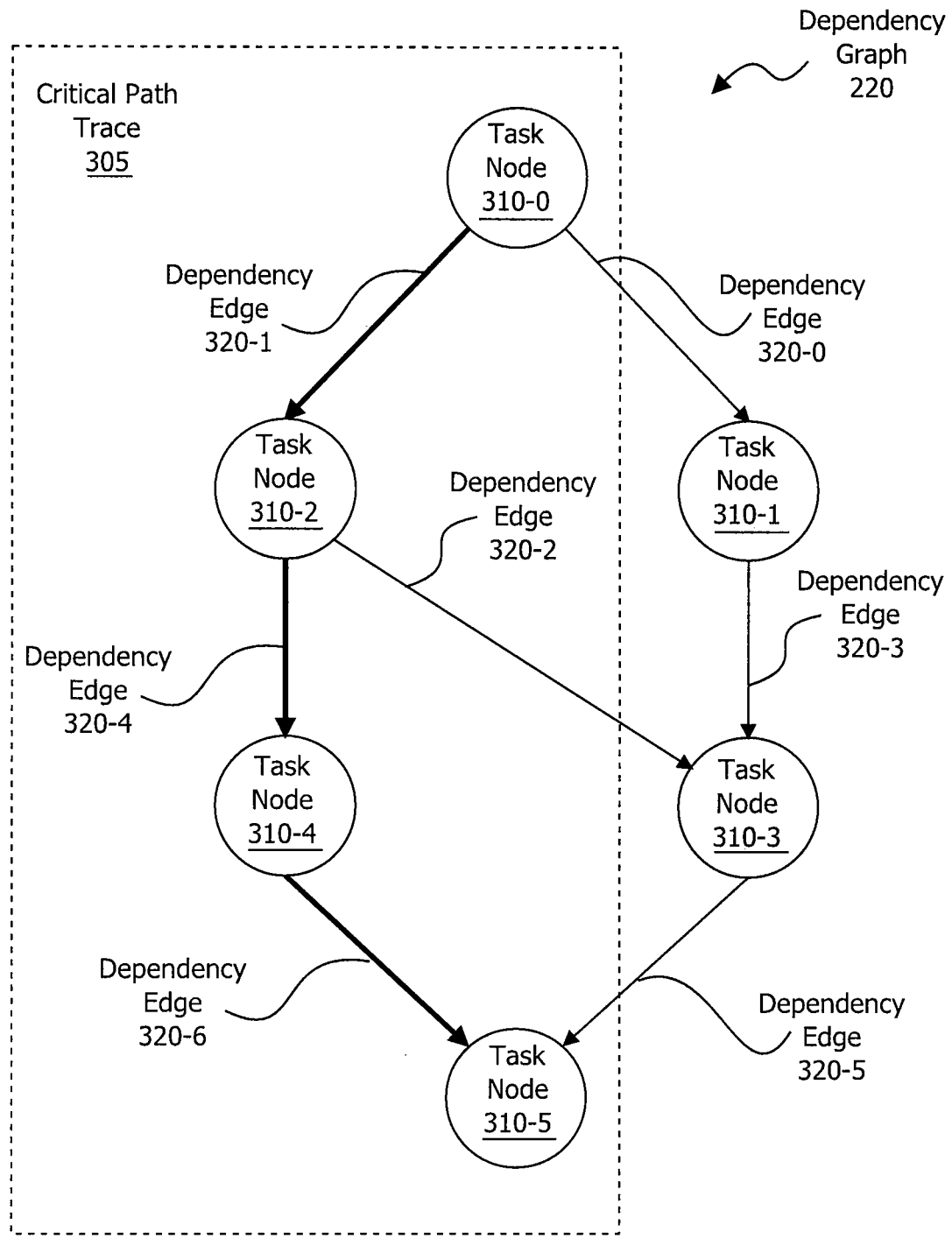
FIG. 3 is a conceptual diagram illustrating the dependency graph of FIG. 2, according to one embodiment of the present invention.

FIG. 3 is a conceptual diagram illustrating the dependency graph 220 of FIG. 2, according to one embodiment of the present invention. As shown, the dependency graph 220 includes one or more task nodes 310 and one or more dependency edges 320.

As previously outlined herein, each of the task nodes 310 included in the dependency graph 220 represents a task, such as a particular CUDA API call 205, a task executing on a particular PPU 202, or a task executing on the CPU 102. In FIG. 3, the task nodes 310-0, 310-2, 310-4 and 310-5 execute on the CPU 102 and are depicted as unfilled circles. By contrast, the task nodes 310-1 and 310-3 execute on the PPU 202 and are depicted as filled circles.

As also disclosed in conjunction with FIG. 2, each of the dependency edges 320 represents a data and/or control dependency between the tasks corresponding to the task nodes 310. As shown, the dependency edge 320-0 indicates that the task represented by the task node 310-0 temporally precedes the task represented by the task node 310-1. Similarly, the dependency edge 320-1 indicates that the task represented by the task node 310-0 precedes the task represented by the task node 310-2.

The dependency edges 320-2 and 320-3 indicate that the task corresponding to the task node 310-3 is reliant on, respectively, the task corresponding to the node 310-2 and the task corresponding to the task node 310-1. Notably, the task corresponding to the task node 310-2 executes on the CPU 102 before the task corresponding to the task node 310-3 executes on the PPU 202. And the task corresponding to the task node 310-1 executes on the PPU 202 before the task corresponding to the task node 310-3 executes on the PPU 202.

As shown, the dependency edge 320-5 indicates that the task represented by the task node 310-3 temporally precedes the task represented by the task node 310-5. Similarly, the dependency edge 320-6 indicates that the task represented by the task node 310-4 precedes the task represented by the task node 310-5. In operation, the task corresponding to the task node 310-4 executes on the CPU 102 before the task corresponding to the task node 310-5 executes on the CPU 102. And the task corresponding to the task node 310-3 executes on the PPU 202 before the task corresponding to the task node 310-5 executes on the CPU 102.

As also shown, a critical path trace 305 visually represents the critical path 290. The critical path trace 305 depicts that the critical path 290 includes the task nodes 310-0, 310-2, 310-4, and 310-5 and is constrained by the dependency edges 320-1, 320-4, and 320-6. If the run-time of any of the tasks represented by the task nodes 310-0, 310-2, 310-4, and 310-5 increases, then the overall execution time of the software application 125 increases correspondingly. By contrast, altering the run-time of the tasks represented by the task nodes 310-1 and 310-3 may not necessarily impact the overall execution time of the software application 125. In the exemplary dependency graph 220, since each of the tasks 310 included in the critical path trace 305 executes on the CPU 102, the critical path trace 305 conveys that the bottle-neck in the performance of the software application 125 is the CPU 102.

Figure 4:
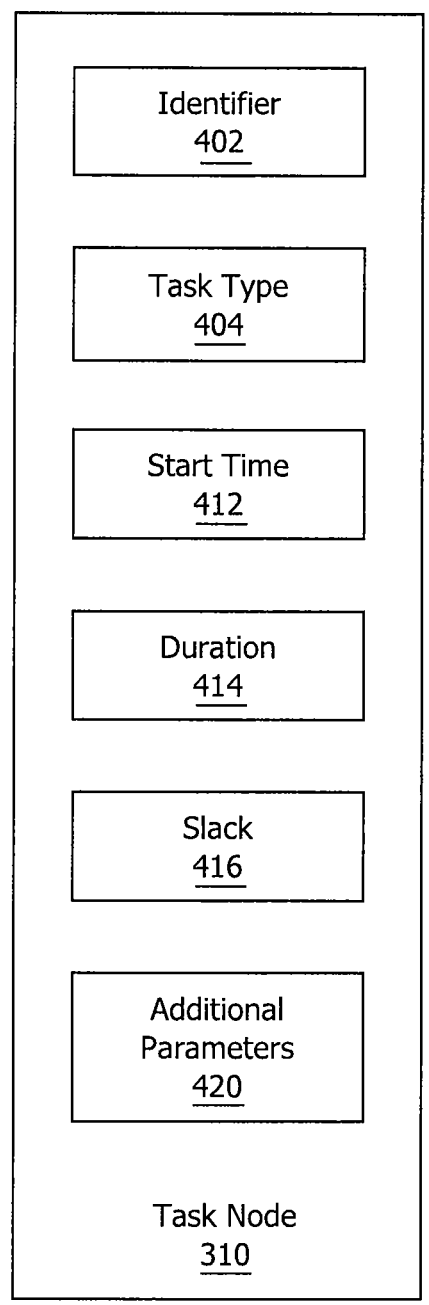
FIG. 4 is a conceptual diagram illustrating the task node of FIG. 3, according to one embodiment of the present invention.

FIG. 4 is a conceptual diagram illustrating the task node 310 of FIG. 3, according to one embodiment of the present invention. As shown, the task node 310 includes, without limitation, an identifier 402, a task type 404, a start type 412, a duration 414, a slack 416, and additional parameters 420.

The identifier 402 uniquely identifies the particular task that is associated with the task node 310. The task type 404 represents the nature of the work performed by the task and/or the executing component within the computer system 100. For instance, the task type 404 may specified a pre-defined type that corresponds to CUDA API calls 205 that execute on the parallel processing subsystem 112.

The start time 412 captures the time at which the task associated with the task node 310 began to execute and the duration 414 corresponds to the time that elapsed while the task associated with the task node 310 executed. The slack 416 is the amount of time that may be added to the start time 412 or duration 414 without impacting the overall execution time of the application 125. Typically, the dependency interpreter 219 derives the slack time 412 based on the execution data 217. As persons skilled in the art will recognize, the slack 416 included in each of the task nodes 310 in the critical path 290 is zero. This corresponds to the definition of the critical path 290—any change that impacts the execution time of a task in the critical path 290 also impacts the overall execution time of the software application 125. By contrast, the slack 416 included in each task node 310 that is not included in the critical path 290 is non-zero.

The additional parameters 420 include any number of values useful for performance analysis. For example, the additional parameters 420 may include the number of other tasks executing on the PPU 102 and parameters of the CUDA API call 205. In alternate embodiments, the number and type of data included in the task node 310 may vary in any manner that facilities the computation of the critical path 290, the earliest and latest start times 412, the slack 416, and exploration of various computer system 100 modification trade-offs.

Figure 5:
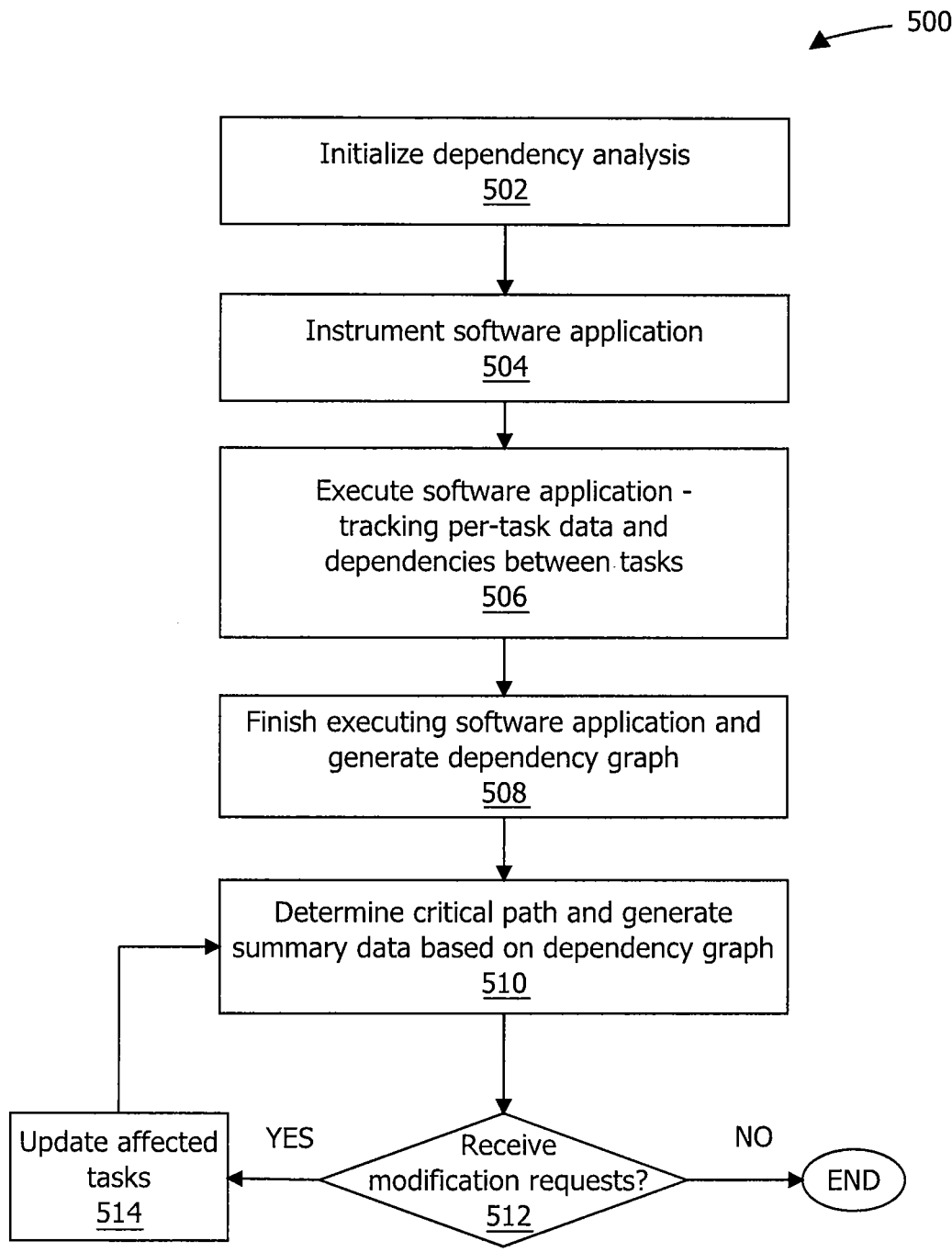
FIG. 5 is a flow diagram of method steps for analyzing the performance of a software application that executes across multiple processing units, according to one embodiment of the present invention.

FIG. 5 is a flow diagram of method steps for analyzing the performance of a software application that executes across multiple processing units, according to one embodiment of the present invention. Although the method steps are described herein in conjunction with the systems of FIGS. 1-4, persons skilled in the art will understand that any system configured to implement the method steps, in any order, falls within the scope of the present invention.

As shown, a method 500 begins at step 502, where the user enables the dependency analysis functionality. In some embodiments, the user may select whether to execute the software application 125 in a tracking mode that enables the dependency extractor 210 and the dependency investigator 230 or a high-performance mode that does not track performance data. In such embodiments, as part of step 502, the user selects the tracking mode.

At step 504, the dependency interposer 212 instruments the software application 125 to track the execution data 217. The dependency interposer 212 may instrument the software application 125 in any technically feasible fashion that enables the dependency interpreter 219 to generate the dependency graph 220. At step 506, the dependency interposer 212 causes the instrumented software application 125 to execute. The execution data 217 generated as the software application 125 executes includes per-task run-time performance data in addition to control and data dependencies between tasks.

At step 508, the software application 125 finishes executing, and the dependency interpreter 219 creates the dependency graph 220 based on the execution data 217. As part of step 508, the dependency interpreter 219 may perform write operations to store the dependency graph 220 is any available memory, such as the system memory 104. At step 510, the dependency investigator 230 evaluates the dependency graph 220, computes the critical path 290, and generates summary data, such as performance statistics. Advantageously, presenting the performance data in this fashion dramatically increases the comprehensibility of often complex interactions between multitudes of tasks. At step 512, if the dependency investigator 230 does not receive a request to modify the dependency graph 220, then the method 500 terminates.

If, at step 512, the dependency investigator 230 receives a request to modify the dependency graph 220, then the method 500 proceeds to step 514. At step 514, the dependency investigator 230 updates the dependency graph 220 to reflect the changes to the affected tasks nodes 310. For instance, suppose that the user were to indicate that the duration of one or more tasks increased. In such a scenario, the dependency investigator 230 would modify the durations 414 included in the corresponding task nodes 310 accordingly. The method 500 then returns to step 510, where the dependency investigator 230 re-evaluates the dependency graph 220, re-computes the critical path 290, and re-generates summary data. The dependency investigator 230 cycles through steps 510-514, receiving and processing requests to modify the dependency graph 202 until the dependency investigator 230 does not receive any additional modification requests.

In sum, together a dependency extractor and a dependency investigator implement techniques that enable developers to evaluate and optimize the overall efficiency of computer system hardware and software (including software applications). In operation, the dependency extractor instruments a software application to capture dependency and performance data associated with each task that is executed on either the CPU or the PPU. Subsequently, the dependency extractor executes the instrumented software application and constructs a dependency graph that captures each task as a node and each dependency as an edge. After the software application completes, the dependency investigator analyzes the dependency graph, identifies the critical path, and summarizes performance statistics. To investigate different optimization strategies, the developer may interact with the dependency investigator—altering run-times of individual tasks and re-analyzing the dependency graph to determine the impact of the modifications on the overall execution of the software application.

Advantageously, enabling task-level performance analysis with dependency tracking enables developers to effectively analyze the overall performance of software applications executing across multiple processing units. By contrast, conventional performance analyzers do not track dependencies between tasks and therefore do not necessarily enable developers to correctly identify those tasks that impact the overall run-time of the software application. Further, the dependency investigator enables the developer to explore the overall effect of altering the run-time of various tasks without re-executing the software application. Consequently, the effort required to successfully improve the overall performance of software applications is reduced compared to conventional approaches to performance analysis in which software applications are repetitively simulated to evaluate different scenarios.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for performance analysis of computer systems, the method comprising:
    receiving a software application that is configured to execute a plurality of computing tasks, wherein each computing task included in the plurality of computing tasks comprises a portion of the software application;
    causing the execution of the software application to generate execution data that includes performance data for each of the plurality of computing tasks and dependency links between different computing tasks included in the plurality of computing tasks;
    based on the execution data, determining a critical path associated with the plurality of computing tasks that includes a first subset of computing tasks included in the plurality of computing tasks and that establishes the overall execution speed of the software application;
    receiving a first simulated modification to the execution data associated with a first computing task included in the plurality of computing tasks;
    generating modified execution data for one or more other computing tasks included in the plurality of computing tasks based on the first simulated modification; and
    based on the modified execution data, determining an updated critical path associated with the plurality of computing tasks that includes a second subset of computing tasks included in the plurality of computing tasks.

2. The method of claim 1, further comprising:
    receiving a second modification to the execution data associated with a second computing task included in the plurality of computing tasks;

generating second modified execution data for one or more other computing tasks included in the plurality of computing tasks based on the second modification; and based on the second modified execution data, determining a second updated critical path associated with the plurality of computing tasks that includes a third subset of computing tasks included in the plurality of computing tasks.

3. The method of claim 1, wherein the second subset is equal to the first subset.

4. The method of claim 1, further comprising performing one or more write operations to store the execution data in a memory.

5. The method of claim 1, wherein the plurality of computing tasks includes the first computing task that is executed on a first parallel processing unit and a second computing task that is executed on a second parallel processing unit.

6. The method of claim 5, wherein the execution data comprises a graph, the first computing task is associated with a first node included in the graph, the second computing task is associated with a second node included in the graph, and a first dependency link comprises a first edge included in the graph.

7. The method of claim 6, wherein the first node includes a first duration, the second node includes a second duration, and the first edge is associated with at least one of a control dependency and a data dependency between the first computing task and the second computing task.

8. The method of claim 7, wherein causing the execution of the software application to generate execution data comprises causing the execution of the software application to generate the first edge based on at least one of the execution of the second computing task and a synchronizing event between the first computing task and the second computing task.

9. The method of claim 1, wherein the plurality of computing tasks includes the first computing task, a second computing task, and a third computing task; and the dependency links include a first link between the first computing task and the second computing task and a second link between the first computing task and the third computing task; and wherein the dependency links do not include any links between the second computing task and the third computing task.

10. A non-transitory computer-readable storage medium including instructions that, when executed by a processor, cause the processor to analyze execution of computer systems by performing the steps of:
receiving a software application that is configured to execute a plurality of computing tasks, wherein each computing task included in the plurality of computing tasks comprises a portion of the software application;
causing the execution of the software application to generate execution data that includes performance data for each of the plurality of computing tasks and dependency links between different computing tasks included in the plurality of computing tasks;
based on the execution data, determining a critical path associated with the plurality of computing tasks that includes a first subset of computing tasks included in the plurality of computing tasks and that establishes the overall execution speed of the software application;
receiving a first simulated modification to the execution data associated with a first computing task included in the plurality of computing tasks;

generating modified execution data for one or more other computing tasks included in the plurality of computing tasks based on the first simulated modification; and based on the modified execution data, determining an updated critical path associated with the plurality of computing tasks that includes a second subset of computing tasks included in the plurality of computing tasks.

11. The non-transitory computer-readable storage medium of claim 10, further comprising:
receiving a second modification to the execution data associated with a second computing task included in the plurality of computing tasks;
generating second modified execution data for one or more other computing tasks included in the plurality of computing tasks based on the second modification; and
based on the second modified execution data, determining a second updated critical path associated with the plurality of computing tasks that includes a third subset of computing tasks included in the plurality of computing tasks.

12. The non-transitory computer-readable storage medium of claim 10, wherein the second subset is equal to the first subset.

13. The non-transitory computer-readable storage medium of claim 10, further comprising performing one or more write operations to store the execution data in a memory.

14. The non-transitory computer-readable storage medium of claim 10, wherein the plurality of computing tasks includes the first computing task that is executed on a first parallel processing unit and a second computing task that is executed on a second parallel processing unit.

15. The non-transitory computer-readable storage medium of claim 14, wherein the execution data comprises a graph, the first computing task is associated with a first node included in the graph, the second computing task is associated with a second node included in the graph, and a first dependency link comprises a first edge included in the graph.

16. The non-transitory computer-readable storage medium of claim 15, wherein the first node includes a first duration, the second node includes a second duration, and the first edge is associated with at least one of a control dependency and a data dependency between the first computing task and the second computing task.

17. The non-transitory computer-readable storage medium of claim 16, wherein causing the execution of the software application to generate execution data comprises causing the execution of the software application to generate the first edge based on at least one of the execution of the second computing task and a synchronizing event between the first computing task and the second computing task.

18. The non-transitory computer-readable storage medium of claim 10, wherein the plurality of computing tasks includes the first computing task, a second computing task, and a third computing task; and the dependency links include a first link between the first computing task and the second computing task and a second link between the first computing task and the third computing task; and wherein the dependency links do not include any links between the second computing task and the third computing task.

19. The non-transitory computer-readable storage medium of claim 10, wherein the first simulated modification to the execution data associated with the first computing task comprises a modification to at least one of an execution start time of the first computing task and an execution duration of the first computing task.

20. A system configured for performance analysis, the system comprising:
   a memory that includes a software application configured to execute a plurality of computing tasks, wherein each computing task included in the plurality of computing tasks comprises a portion of the software application;
   a processor coupled to the memory and, when executing the software application, is configured to:
      cause the execution of the software application to generate execution data that includes performance data for each of the plurality of computing tasks and dependency links between different computing tasks included in the plurality of computing tasks;
      based on the execution data, determine a critical path associated with the plurality of computing tasks that includes a first subset of computing tasks included in the plurality of computing tasks and that establishes the overall execution speed of the software application;
      receive a first simulated modification to the execution data associated with a first computing task included in the plurality of computing tasks;
      generate modified execution data for one or more other computing tasks included in the plurality of computing tasks based on the first simulated modification; and
      based on the modified execution data, determine an updated critical path associated with the plurality of computing tasks that includes a second subset of computing tasks included in the plurality of computing tasks.

21. The system of claim 20, wherein the processor is further configured to:
   receive a second modification to the execution data associated with a second computing task included in the plurality of computing tasks;
   generate second modified execution data for one or more other computing tasks included in the plurality of computing tasks based on the second modification; and
   based on the second modified execution data, determine a second updated critical path associated with the plurality of computing tasks that includes a third subset of computing tasks included in the plurality of computing tasks.

* * * * *

UNITED STATES PATENT AND TRADEMARK OFFICE
CERTIFICATE OF CORRECTION

| | | |
|---|---|---|
| PATENT NO. | : 9,684,581 B2 | Page 1 of 1 |
| APPLICATION NO. | : 14/283700 | |
| DATED | : June 20, 2017 | |
| INVENTOR(S) | : Kerr et al. | |

It is certified that error appears in the above-identified patent and that said Letters Patent is hereby corrected as shown below:

In the Specification

Column 1, Line 4, please insert:
--GOVERNMENT RIGHTS IN THIS INVENTION
This invention was made with US Government support under LLNS subcontract B599861 awarded by DOE. The US Government has certain rights in this invention.--.

Signed and Sealed this
Twenty-first Day of July, 2020

Andrei Iancu
*Director of the United States Patent and Trademark Office*